United States Patent
Lee et al.

(10) Patent No.: US 11,104,285 B2
(45) Date of Patent: Aug. 31, 2021

(54) VEHICLE COLLISION PREDICTION ALGORITHM USING RADAR SENSOR AND ULTRASONIC PARK ASSIST SENSOR

(71) Applicant: GM GLOBAL TECHNOLOGY OPERATIONS LLC, Detroit, MI (US)

(72) Inventors: Keunwoo Lee, Incheon (KR); Kihong Park, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 866 days.

(21) Appl. No.: 15/816,464

(22) Filed: Nov. 17, 2017

(65) Prior Publication Data
US 2018/0251092 A1   Sep. 6, 2018

(30) Foreign Application Priority Data
Mar. 6, 2017   (KR) ......................... 10-2017-0028375

(51) Int. Cl.
*B60R 21/0134*   (2006.01)
*B60R 21/0132*   (2006.01)
(Continued)

(52) U.S. Cl.
CPC ...... *B60R 21/0134* (2013.01); *B60R 21/0132* (2013.01); *B60R 21/01338* (2014.12);
(Continued)

(58) Field of Classification Search
CPC .... G01S 13/931; G01S 15/931; G01S 13/862; G01S 13/60; G01S 2013/932;
(Continued)

(56) References Cited

U.S. PATENT DOCUMENTS

| 5,936,549 A * | 8/1999 | Tsuchiya ................... G01P 3/42 340/903 |
| 2003/0220728 A1* | 11/2003 | Rao ........................ G08G 1/165 701/45 |

(Continued)

FOREIGN PATENT DOCUMENTS

| DE | 102004029532 A1 | 1/2006 |
| DE | 102005003354 A1 | 8/2006 |

(Continued)

OTHER PUBLICATIONS

K. Cho, S. B. Choi and H. Lee, "Design of an Airbag Deployment Algorithm Based on Precrash Information," in IEEE Transactions on Vehicular Technology, vol. 60, No. 4, pp. 1438-1452, May 2011, doi: 10.1109/TVT.2011.2126614. (Year: 2011).*

(Continued)

*Primary Examiner* — Jeffrey C Boomer
*Assistant Examiner* — Paul Allen
(74) *Attorney, Agent, or Firm* — Cantor Colburn LLP

(57) ABSTRACT

A method and apparatus of predicting a crash are provided. The method includes detecting coordinates of a target obstacle based on first coordinate information of a radar sensor and second coordinate information of an ultrasonic sensor, translating the second coordinate information to the coordinate system of the first coordinate information and generating translated coordinate information, estimating a position, speed, and acceleration of a vehicle if the vehicle is a predetermined distance from the target obstacle based on the translated coordinate information, determining a potential crash type between the vehicle and the target obstacle based on the estimated position, speed and acceleration of the vehicle, determining a three-dimensional movement trajectory based on the estimated position, speed and acceleration of the vehicle and the determined crash type, and predicting a crash point of the vehicle, a crash point of the (Continued)

target object and a crash time based on the three-dimensional movement trajectory.

17 Claims, 10 Drawing Sheets

(51) Int. Cl.
| | |
|---|---|
| *G01S 13/931* | (2020.01) |
| *G01S 13/86* | (2006.01) |
| *G01S 13/60* | (2006.01) |
| *G01S 15/931* | (2020.01) |
| *B60R 21/01* | (2006.01) |
| *B60R 21/00* | (2006.01) |
| *B60R 19/48* | (2006.01) |

(52) U.S. Cl.
CPC ............ *G01S 13/60* (2013.01); *G01S 13/862* (2013.01); *G01S 13/931* (2013.01); *G01S 15/931* (2013.01); *B60R 19/483* (2013.01); *B60R 2021/0002* (2013.01); *B60R 2021/0004* (2013.01); *B60R 2021/0006* (2013.01); *B60R 2021/0009* (2013.01); *B60R 2021/0025* (2013.01); *B60R 2021/01013* (2013.01); *B60R 2021/01231* (2013.01); *B60R 2021/01286* (2013.01); *G01S 2013/932* (2020.01); *G01S 2013/9324* (2020.01); *G01S 2013/93271* (2020.01); *G01S 2013/93275* (2020.01); *G01S 2015/938* (2013.01)

(58) Field of Classification Search
CPC ... G01S 2013/9324; G01S 2013/93271; G01S 2015/938; G01S 2013/93275; G01S 15/42; G08G 1/16–168; B60W 30/08–0956; B60R 21/0134; B60R 21/0132–01338; B60R 19/483; B60R 21/01338; B60R 2021/01013; B60R 2021/01231; B60R 2021/0025; B60R 2021/0004; B60R 2021/01286; B60R 21/00
USPC ..................................................... 701/45–47
See application file for complete search history.

(56) References Cited

U.S. PATENT DOCUMENTS

| | | | | |
|---|---|---|---|---|
| 2003/0227217 | A1* | 12/2003 | Yoshizawa | B60R 21/0132 303/193 |
| 2004/0019420 | A1* | 1/2004 | Rao | B60R 21/0132 701/45 |
| 2007/0228704 | A1* | 10/2007 | Cuddihy | B60R 21/0132 280/735 |
| 2007/0228705 | A1* | 10/2007 | Rao | B60R 21/0134 280/735 |
| 2008/0201042 | A1* | 8/2008 | Cuddihy | B60R 21/0134 701/45 |
| 2009/0326764 | A1* | 12/2009 | Rao | B60R 21/0134 701/45 |
| 2010/0214155 | A1* | 8/2010 | Harada | B60R 21/0134 342/147 |
| 2014/0052355 | A1* | 2/2014 | Heinrichs-Bartscher | B60W 30/0956 701/70 |
| 2015/0035694 | A1* | 2/2015 | van Uffelen | G01S 13/931 342/27 |
| 2015/0039218 | A1* | 2/2015 | Bowers | B60W 30/08 701/301 |
| 2017/0057499 | A1* | 3/2017 | Kim | G05D 1/0255 |
| 2017/0291602 | A1* | 10/2017 | Newman | G08G 1/16 |

FOREIGN PATENT DOCUMENTS

| | | | |
|---|---|---|---|
| DE | 102014207626 A1 | 10/2015 | |
| KR | 20110037441 A * | 4/2011 | |
| WO | WO-9201954 A1 * | 2/1992 | ........... G01S 15/878 |

OTHER PUBLICATIONS

M. Murad, J. Nickolaou, G. Raz, J. S. Colburn and K. Geary, "Next generation short range radar (SRR) for automotive applications," 2012 IEEE Radar Conference, Atlanta, GA, 2012, pp. 0214-0219, doi: 10.1109/RADAR.2012.6212139. (Year: 2012).*
D. Böhmländer et al., "A novel approach for intelligent pre-crash threat assessment systems," 17th International IEEE Conference on Intelligent Transportation Systems (ITSC), Qingdao, 2014, pp. 954-961, doi: 10.1109/ITSC.2014.6957812. (Year: 2014).*
Cho Kwang Hyun—English Description of KR-20110037441-A via Espacenet Patent Translate, retrieved Jul. 28, 2020 (Year: 2020).*
Noll Martin—English Description of WO-9201954-A1 via Espacenet Patent Translate, Apr. 23, 2021. (Year: 2021).*

* cited by examiner

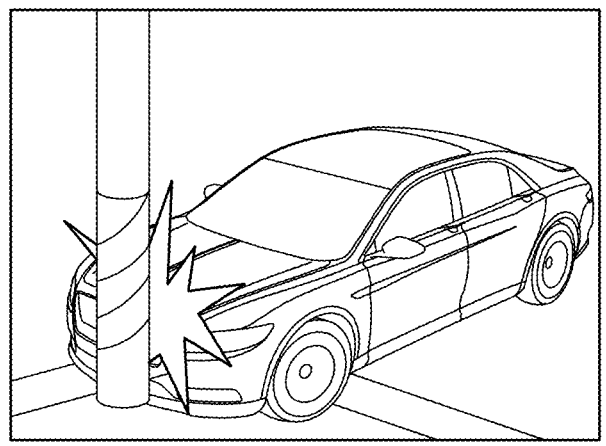
(A)
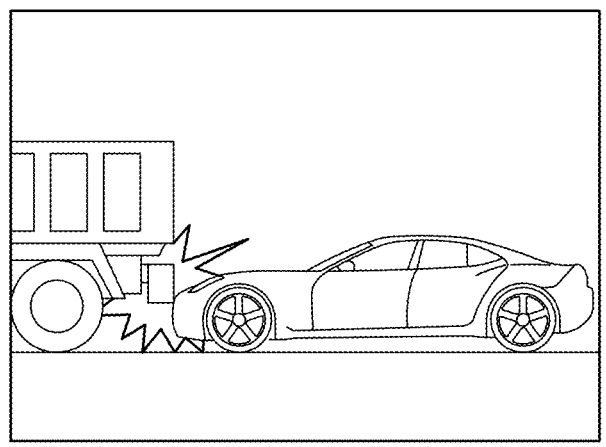
(B)
*Fig-2*
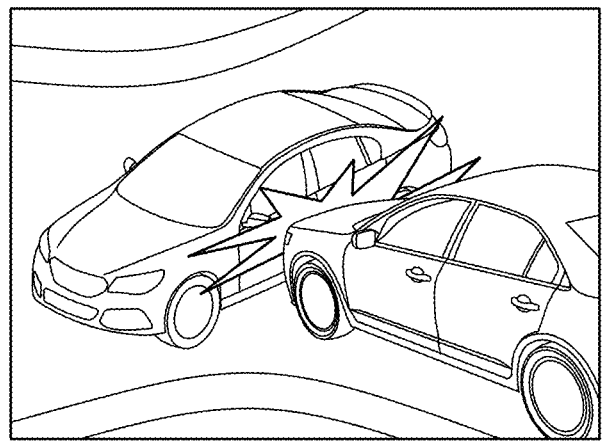
(C)

VEHICLE COLLISION PREDICTION ALGORITHM USING RADAR SENSOR AND ULTRASONIC PARK ASSIST SENSOR

CROSS REFERENCE TO RELATED APPLICATIONS

The present application claims priority from Korean Patent Application No. 10-2017-0028375, filed on Mar. 6, 2017 in Korean Intellectual Property Office, the disclosure of which is hereby incorporated by reference herein.

INTRODUCTION

Apparatuses and methods consistent with exemplary embodiments relate to crash prediction. More particularly, apparatuses and methods consistent with exemplary embodiments relate to crash prediction algorithms using vehicle sensors and airbag deployment.

Airbag devices in vehicles are an automobile safety technology whose installation is legally mandated in many countries including the United States and Europe. Early airbags would expand rapidly with the driver near the airbag due to the rapid deceleration during a crash and sometimes cause injury to the driver. To address this problem airbags with reduced pressure airbags were developed. However, the reduced pressure airbags were less effective when passengers of a vehicle were not wearing their seat belts. In addition, to protect drivers from various types of vehicle accident such as side crashes, offset crashes, and capsizing, the number of airbags being installed in a vehicle is increasing.

An issue with airbag deployment and the algorithm that initiates deployment is that sensors may not be able to detect a crash. Due to the limitations of deployment algorithms, there is a possibility that the airbags will be deployed late or early, or will fail to deploy at all. Thus, additional developments in airbag technology are required to address these issues.

SUMMARY

Exemplary embodiments address the above-stated problems. More specifically, one or more exemplary embodiments address the limitations of conventional physical contact-based airbag deployment algorithms to provide a crash prediction algorithm that can improve the accuracy of airbag deployment.

According to an exemplary embodiment, a method of predicting a crash is provided. The method includes detecting coordinates of a target obstacle based on radar coordinate information of at least one radar sensor and ultrasonic coordinate information of at least one ultrasonic sensor; translating the ultrasonic coordinate information to a coordinate system of the radar coordinate information and generating combined coordinate information, estimating a position, speed, and acceleration of a vehicle if the vehicle is a predetermined distance from the target obstacle based on the combined coordinate information, determining a crash type from among an edge type crash or a plane type crash that will occur between the vehicle and the target obstacle based on the estimated position, speed and acceleration of the vehicle, determining a three-dimensional movement trajectory based on the estimated position, speed and acceleration of the vehicle and the determined crash type, and predicting a crash point of the vehicle, a crash point of the target object and a crash time based on the three-dimensional movement trajectory.

The predetermined distance may be a minimum detection range of the radar sensor or a predetermined minimum distance from the radar sensor.

The determining the three-dimensional movement trajectory may include applying a curve fitting using the estimated position, speed and acceleration of the vehicle.

The determining whether the edge type crash or the plane type crash will occur may include based on a linear equation derived from combined coordinates information of the target obstacle, determining that the edge type crash will occur if one or more distances between the at least one ultrasonic sensor and the target obstacle are less than a predetermined value, and determining that the plane type crash will occur if a slope between first coordinates of the target obstacle measured by a first sensor of the at least one ultrasonic sensor and second coordinates of the object measure by a second sensor of the at least one ultrasonic sensor intersects the linear equation derived from the combined coordinate information of the target obstacle.

The determining the edge type crash will occur may include using N number of coordinates that depict a shape of a bumper of the vehicle to substitute a y value of the N number of coordinates that depict the shape of the bumper into the computed three-dimensional movement trajectory, the predicting the crash point of the vehicle may include predicting the crash point of the vehicle as a point where a difference between a value resulting from substituting the y value into the computed three-dimensional movement trajectory and an x value of the N number coordinates is smallest, and the predicting the crash point of the target object may include determining a point where a sum of distances between the at least one ultrasonic sensor and the target obstacle is smallest as the crash point of the target object.

The determining whether an edge type crash or a plane type crash will occur may include taking a plurality of measurements of a lateral relative speed of the vehicle using the radar sensor, the determining the three-dimensional movement trajectory may be performed based on the plurality of measurements of the lateral relative speed of the vehicle, the crash point of the vehicle and the crash point of the target object, and the predicting the crash time may include determining a point at time where the value of the three-dimensional movement trajectory becomes 0 as the crash time.

The determining that the plane type crash will occur may include calculating a speed vector using the relative speed measured by the radar sensors, determining a first linear formula corresponding to a shape of the target obstacle and a second linear formula corresponding to a shape of a bumper of the vehicle based on the speed vector and N number of coordinates corresponding to shape of the bumper of the vehicle, predicting the crash point of the vehicle where the determined distance is smallest, and predicting the crash point of the target object as a point where the first linear formula and the computed three-dimensional movement trajectory intersect.

The determining whether the edge type crash or the plane type crash will occur may include taking a plurality of measurements of a lateral relative speed of the vehicle using the radar sensor, the determining the three-dimensional movement trajectory may be performed based on the plurality of measurements of the lateral relative speed of the vehicle, the crash point of the vehicle and the crash point of the target object, and the predicting the crash time may include determining a point at time where the value of the three-dimensional movement trajectory becomes 0 as the crash time.

The method may also include setting a required time to fire of at least one airbag based on the determined crash type and the determined crash time.

According to an exemplary embodiment, a crash prediction apparatus is provided. The apparatus includes at least one memory comprising computer executable instructions; and at least one processor configured to read and execute the computer executable instructions. The computer executable instructions may cause the at least one processor to detect coordinates of a target obstacle based on radar coordinate information of at least one radar sensor and ultrasonic coordinate information of at least one ultrasonic sensor, translate the ultrasonic coordinate information to a coordinate system of the radar coordinate information and generate combined coordinate information, estimate a position, speed, and acceleration of a vehicle if the vehicle is a predetermined distance from the target obstacle based on the combined coordinate information, determine a crash type from among an edge type crash or a plane type crash that will occur between the vehicle and the target obstacle based on the estimated position, speed and acceleration of the vehicle, determine a three-dimensional movement trajectory based on the estimated position, speed and acceleration of the vehicle and the determined crash type, and predict a crash point of the vehicle, a crash point of the target object and a crash time based on the three-dimensional movement trajectory.

The predetermined distance may be a minimum detection range of the radar sensor or a predetermined minimum distance from the radar sensor.

The computer executable instructions may cause the at least one processor to determine the three-dimensional movement trajectory by applying a curve fitting equation using the estimated position, speed and acceleration of the vehicle.

The computer executable instructions may cause the at least one processor to determine whether the edge type crash or the plane type crash will occur by based on a linear equation derived from the combined coordinates information of the target obstacle, determining that the edge type crash will occur if one or more distances between the at least one ultrasonic sensor and the target obstacle are less than a predetermined value, and determining that the plane type crash will occur if a slope between first coordinates of the target obstacle measured by a first sensor of the at least one ultrasonic sensor and second coordinates of the object measure by a second sensor of the at least one ultrasonic sensor intersects the linear equation derived from the combined coordinate information of the target obstacle.

The computer executable instructions may cause the at least one processor to determine the edge type crash will occur by using N number of coordinates that depict a shape of a bumper of the vehicle and substituting a y value of the N number of coordinates that depict the shape of the bumper into the computed three-dimensional movement trajectory, predict the crash point of the vehicle by predicting the crash point of the vehicle as a point where a difference between a value resulting from substituting the y value into the computed three-dimensional movement trajectory and an x value of the N number coordinates is smallest, and predict the crash point of the target object by determining a point where a sum of distances between the at least one ultrasonic sensor and the target obstacle is smallest as the crash point of the target object.

The computer executable instructions may cause the at least one processor to determine whether the edge type crash or the plane type crash will occur by taking a plurality of measurements of a lateral relative speed of the vehicle using the radar sensor, determine the three-dimensional movement trajectory based on the plurality of measurements of the lateral relative speed of the vehicle, the crash point of the vehicle and the crash point of the target object, and predict the crash time by determining a point at time where the value of the three-dimensional movement trajectory becomes 0 as the crash time.

The computer executable instructions may further cause the at least one processor to determine that the plane type crash will occur by calculating a speed vector using a relative speed of the vehicle and target obstacle measured by the radar sensors, determining a first linear formula corresponding to a shape of the target obstacle and a second linear formula corresponding to a shape of a bumper of the vehicle based on the speed vector and N number of coordinates corresponding to shape of the bumper of the vehicle, predicting the crash point of the vehicle where a determined distance is smallest, and predicting the crash point of the target object as a point where the first linear formula and the computed three-dimensional movement trajectory intersect.

The computer executable instructions may further cause the at least one processor to determine whether the edge type crash or the plane type crash will occur by taking a plurality of measurements of a lateral relative speed of the vehicle using the radar sensor, determine the three-dimensional movement trajectory based on the plurality of measurements of the lateral relative speed of the vehicle, the crash point of the vehicle and the crash point of the target object, and predict the crash time by determining a point at time where the value of the three-dimensional movement trajectory becomes 0 as the crash time.

The computer executable instructions may further cause the at least one processor to set a required time to fire of at least one airbag based on the determined crash type and the determined crash time.

The apparatus may include an airbag electronic controller unit; and an airbag, and the computer executable instructions further cause the at least one processor to control the airbag electronic controller module to fire the airbag according to the required time to fire.

Accordingly, it may be possible to address the limitations of physical contact-based airbag deployment algorithms by predicting the crash type, crash point and time of crash to improve airbag deployment reliability with respect to crashes that provide insufficient impulses to the airbag deployment mechanisms. In addition, exemplary embodiments provide a crash prediction algorithm that can improve the accuracy of airbag deployment. Other objects, advantages and novel features of the exemplary embodiments will become more apparent from the following detailed description of exemplary embodiments and the accompanying drawings.

BRIEF DESCRIPTION OF THE DRAWINGS

FIG. 2 is an illustration showing representative situations which can cause airbag malfunction or failure to deploy;

DETAILED DESCRIPTION OF EXEMPLARY EMBODIMENTS

Figure 1:
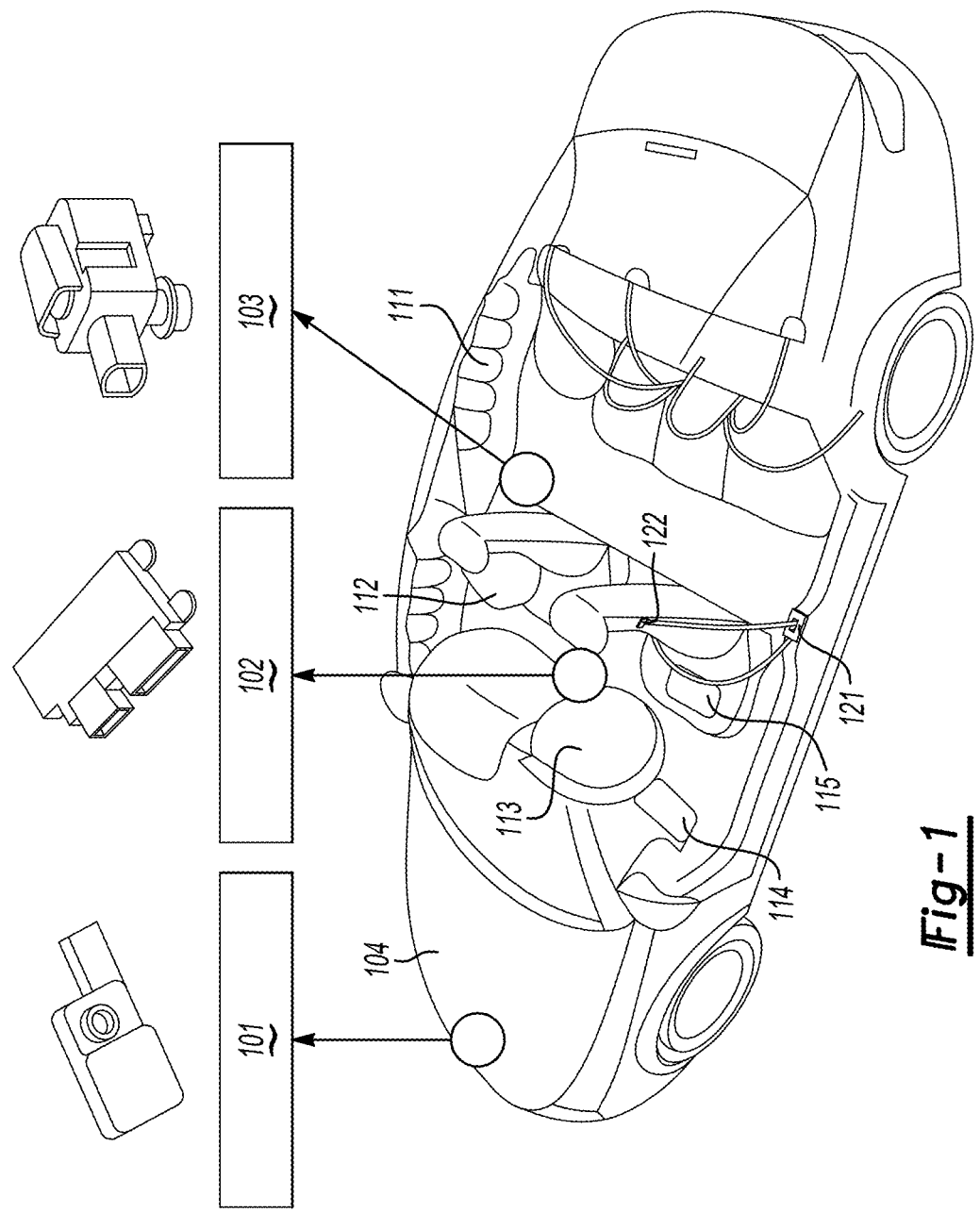
FIG. 1 is an illustration used to explain an airbag system according to an aspect of an exemplary embodiment.

An apparatus and method that predict a vehicle collision will now be described in detail with reference to FIGS. 1-16 of the accompanying drawings in which like reference numerals refer to like elements throughout the disclosure.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

FIG. 1 is an illustration used to explain an airbag system according to an aspect of an exemplary embodiment. Referring to FIG. 1, vehicles may include multiple airbag devices. The airbag devices may include side airbags 112, curtain airbags 111, center airbags, front airbags 113 and knee airbags 114, anti-submarining airbags 115. In one example, advanced airbag devices that can detect the size of the crash, the weight of the passenger, whether the seatbelt is worn, and the position of the seat to determine whether to deploy the airbag as well as the pressure with which the airbag will expand.

The components of an airbag system may include the inflator, which is a gas generator that inflates the airbag when it is deployed, the cushion, which holds the airbag gases and directly protects the passenger, an airbag module that holds the airbag and opens or is torn apart when the airbag expands, front crash sensors 101 and side crash sensors 102 which detect crashes, sensors that detect the presence of passengers and their locations, sensors that detect the size of passengers, and a Sensor Diagnostic Module (SDM), which contains an algorithm that analyzes the signals from the sensors and determines whether or not to deploy the airbags and operates a plurality of airbags and retractor belt tensioners 121 and buckle tensioners 122 of seat belts.

The deployment of an airbag may be as follows. A plurality of crash sensors installed in a crash zone such as a bumper or active hood 104, which is the part of the vehicle that is subjected to the physical crash, and the electronic semiconductor acceleration sensors within an airbag ECU 103 located in a non-crash zone, which is a relatively safe area, recognize a crash and distinguish between normal operating circumstances, accidents, rapid acceleration and rapid deceleration. Based on this, the SDM determines whether to and when to deploy the airbags.

With the airbag deployment algorithm, as illustrated in FIG. 1, the crash sensors and the acceleration sensors inside the SDM are used to detect and determine crash and categorize the crash type. If the acceleration reaches a certain threshold value depending on the crash type, the airbags are deployed. However, because such mechanism determines a crash and decides whether to deploy the airbags based on data measured directly from a crash, the mechanism is subject to the limitations of physical contact-based sensors.

FIG. 2 is an illustration showing representative situations that can cause airbag malfunction or failure to deploy. Referring to FIG. 2, such situations may involve an obstacle crashing into the vehicle in the front or sides in a blind spot outside the detection zones of the sensors as shown in (a) and (c) of FIG. 2. This may cause insufficient impact to the sensor for the crash to be detected. In (b) of FIG. 2, an obstacle crashing into the vehicle at a location higher than the sensors may also cause insufficient impact to the sensor and the sensor may not trigger the airbag. In addition, various causes such as sensor malfunctions causing delays in sensor output, signal generation, or failure of such signals to be generated, may prevent deployment of the airbag.

One method to address airbag malfunctions is to attempt to apply the environmental sensors of active safety systems to airbag systems. Using one or more radar sensors, a crash prediction algorithm defines crash zones and, if a target object exists within such a crash zone, reduces the deployment threshold within the airbag deployment algorithm to deploy the airbags early. In other words, prior to crash, the crash prediction algorithm lowers the threshold within the airbag deployment algorithm early on to accelerate the speed of deployment of the airbag, determines the crash strength using the relative speed prior to crash, and variably sets the threshold of the airbag deployment algorithm.

In addition, based on crash prediction algorithms, improved airbag deployment algorithms based on crash type and crash strength estimation may be used. Using the Time To Crash (TTI) predicted from the radar sensors and the acceleration sensor installed within the SDM, the measured lateral acceleration is analyzed to determine the hardness of the obstacle in front of the vehicle. In the aforementioned system, crash sensors for airbag deployment may not be used, and the airbag may be deployed using only the acceleration sensor and radar sensors.

When predicting a crash using a crash prediction algorithm and deploying the airbag quicker when the obstacle enters the crash zone by reducing the threshold for deploying the airbag, there is the likelihood that the airbag may be triggered even by weak crashes or a non-crash. Moreover, determining the crash strength based on relative speed means that it is possible, that the Required Time To Fire (RTTF) of the airbag may not be met in cases where the force of the front obstacle is high during a high speed crash due to airbag deployment algorithm. In addition, as only radar sensor output may be used, the exact behavior of an object after it enters the Minimum Detection Range (MDR) of the sensors may not be known.

Further, using the acceleration data measured by the SDM and additional data output from radar sensors installed on the front of the vehicle, movement of the target object is measured prior to a crash to predict the likelihood of crash and the angle of the crash and then used to set the airbag RTTF. However, such a method does not to reflect the measuring characteristics of actual sensors because it assumes the impact point on an opposing obstacle may continuously be measured.

Figure 3:
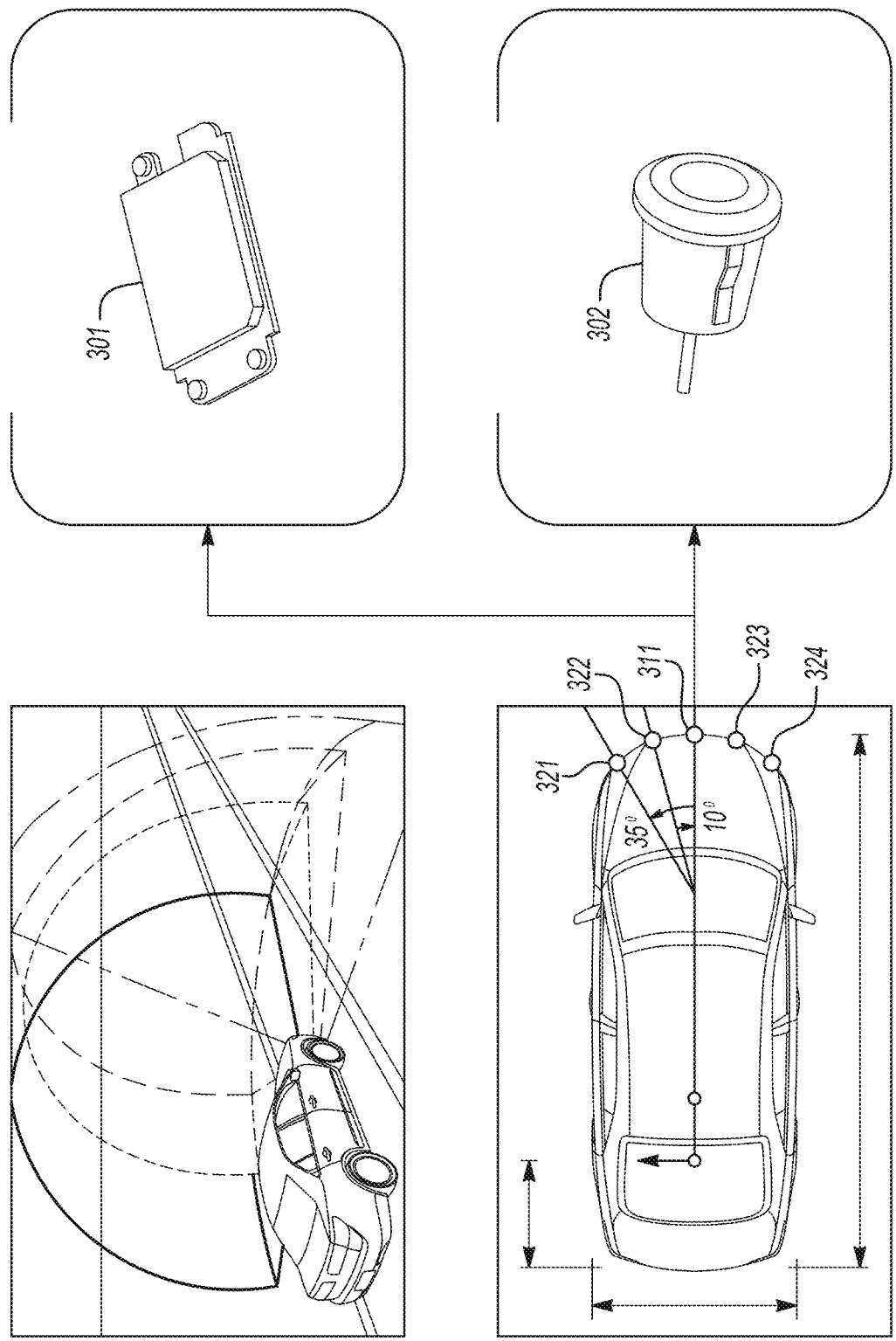
FIG. 3 is a drawing showing the positions where the radar sensors and ultrasonic sensors may be installed according to an aspect of an exemplary embodiment.

FIG. 3 is a drawing showing the positions where the radar sensors 301 and ultrasonic sensors (e.g., UPA sensors) may be installed according to an aspect of an exemplary embodiment. The radar sensor 301 may have a 30 Hz sampling rate, a 60 degree field of view, and a detection range of 2-200 meters. An ultrasonic sensor 302 may have may have a 30 Hz sampling rate, a 180 degree field of view, and a detection range of 0.5-5 meters. Referring to FIG. 3, a system used to predict crashes using a radar sensor 311 and Ultrasonic sensors 321-324 installed on the front of a vehicle is illustrated. The system may implement the method to predict crashes.

The method to predict crashes may include a two-step process where the respective coordinate systems of the sensors are converted to a standard coordinate system of the vehicle (i.e., combined coordinate information), and the data is converted into algorithm input data.

First, the physical reference point for the measured values obtained from the one radar sensor 311 and four ultrasonic sensors 311-314 is the point where the applicable sensor is installed. In other words, because the sensors having different coordinate systems, the sensors output relative distances and azimuth angles. Accordingly, calibration of the positions where the respective sensors are installed, as well as conversion to the coordinate system (GLOBAL_X, GLOBAL_Y) for the position where the radar sensor is installed using a trigonometric function are necessary. This process is shown using the equations (1.1 to 1.4) below.

<Radar Sensor Coordinate System>

$$X_R + R_R \cdot \cos(\theta_R)$$ Equation 1.1, $$Y_R + -R_R \cdot \sin(\theta_R)$$ Equation 1.2, where $R_R$ is a distance measured by radar sensor, and $\theta_R$ is an angle measured by radar sensor, and $X_R$, $Y_R$ is a measured position of the obstacle from position radar sensor is installed on vehicle.

<Ultrasonic Sensor Coordinate System>

$$X_{US} = R_{US} \cdot \cos(\theta_{US} + \theta_{offset}) + X_{offset}$$ Equation 1.3, $$Y_{US} = R_{US} \cdot \sin(\theta_{US} + \theta_{offset}) + Y_{offset}$$ Equation 1.4, where $X_{offset}$, $Y_{offset}$ is an offset for ultrasonic sensor installation position, $\theta_{offset}$ is an offset for ultrasonic sensor installation angle for sensor calibration, $R_{US}$, $\theta_{US}$ is distance/angle measured by ultrasonic sensor, and $X_{US}$, $Y_{US}$ is position of obstacle measured respective to vehicle with consideration for installation position of ultrasonic sensor.

To express the measurement values from the plurality of sensors according to a single fixed coordinate axis with respect to the radar sensor requires, as shown above, the installation position ($X_{offset}$, $Y_{offset}$) and installation angle ($\theta_{offset}$) of the respective ultrasonic sensors with respect to the radar sensor. In the calculation process, this is reflected to calibrate the X-axis and Y-axis measurement points of the ultrasonic sensor as shown above. The relative speed ($V_{R_x}$, $V_{R_y}$) is also calculated in the manner shown above and converted to the reference coordinate system for the vehicle (i.e., combined coordinate information).

Next, the speed estimation algorithm using a Kalman filter will be explained. Once an obstacle enters the minimum detection range of the radar sensor (R), no information can be received from the radar sensor. According to an example, to predict the speed and position of an obstacle within the minimum detection range, a Kalman filter may be used. A Kalman filter is a filter that uses previous values and current values to estimate optimal values using recursive computations.

Figure 4:
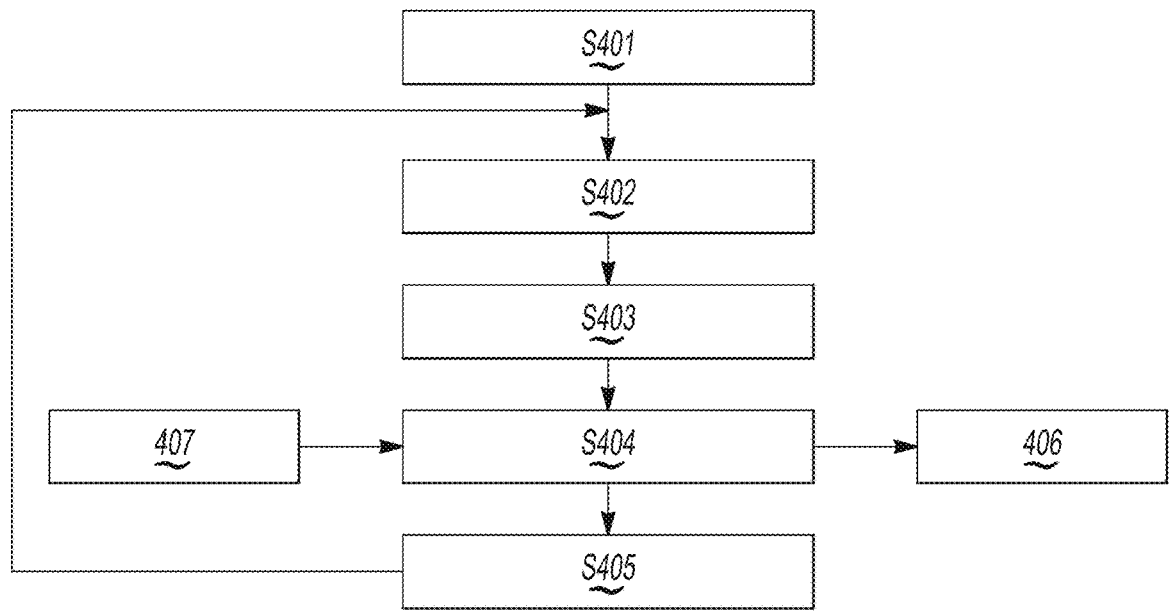
FIG. 4 is a flowchart to explain the process by which the error covariance is calculated using a Kalman filter.

FIG. 4 is a drawing to explain the process by which the error covariance is calculated using a Kalman filter. Referring to FIG. 4, the major components of determining error covariance are prediction and estimation. In operation S401, an initial value (x0) for a predicted value ($P_0$) and error covariance are selected. Operation S402 shows a step that belongs to the prediction process, where the last estimated value ($\hat{x}_{k-1}$) and the last error covariance ($P_{k-1}$) or initial predicted value and error covariance are received as input to calculate a predicted value ($\hat{x}_k$, $P_k$). The predicted value may be calculated according to the equation: $\hat{x}_k^- = A\hat{x}_{k-1}$, where A is matrix of the dynamic properties of the system described below.

Moreover, the error estimated covariance may be calculated according to the equation: $P_k^- = A P_{k-1} A^T + Q$, where A is Matrix of the dynamic properties of the system described below.

Operations S403-405 show steps belong to the estimation process. In particular, the Kalman gain ($K_k$) is determined in operation S403. The Kalman gain may be determined using the equation: $K_k = P_k^- H^T (H P_k^- H^T + R)^{-1}$, where H is a transition matrix described below.

In operation S404, the Kalman gain is used to calculate the estimated value ($\hat{x}_k$) 406 by using the measured value ($Z_k$) 407. The estimated value may be determined using the equation: $\hat{x}_k = \hat{x}_k^- + K_k(Z_k - H\hat{x}_k^-)$, Next, the error covariance ($P_k$) is determined in S405 and used as input for the prediction step S402, and recursive operations are carried out. The error covariance may be determined using the equation: $P_k = P_k^- - K_k H P_k^-$.

Speed and position may be estimated within the minimum detection range of the radar sensor (R) based on the following system model shown below. The system model for the estimation of velocity ($V_{k+1}$) and acceleration ($a_{k+1}$) are Equations (1.5). The state variables representing the movement at time may be defined using Equation (1.6).

$$V_{k+1} = V_k + a_k \cdot dt$$

$$a_{k+1} = -\frac{V_{k-1}}{dt} + \frac{V_k}{dt} = \frac{V_k - V_{k-1}}{dt},$$ Equation 1.5

$$X_k = [V_{k-1}, V_k, a_k]^T,$$ Equation 1.6 where $X_k$ defines the state variable representing the movement of the object.

Position is estimated through a method identical to the above, and the system model is as shown in Equation 1.7. Here, the status variables are defined by Equation 1.8. The same is done for both X-axis coordinates and Y-axis coordinates.

$$X_{K+1} = X_k + V_k \cdot dt$$

$$V_{Rx(k+1)} = -\frac{X_{k-1}}{dt} + \frac{X_k}{dt} = \frac{X_k - X_{k-1}}{dt},$$ Equation 1.7 where $X_{k+1}$, $V_{Rx(k+1)}$ are speed and acceleration of an object.

$$X_k = [X_{k-1}, X_k, V_k]^T$$ Equation 1.8 where $x_k$ defines the status variable representing the movement of the object.

To design the Kalman filter, the system model is shown a state space, as shown in Equation (1.9) and Equation (1.10). The state transition matrix A for the system model established in Equation (1.5) and Equation (1.7), and matrix H associated with the measurement value is shown in Equation (1.11).

$$x_{k+1} = Ax_k + w_k$$ Equation 1.9

$$z_k = Hx_k + v_k$$ Equation 1.10

$$A = \begin{bmatrix} 0 & 1 & 0 \\ 0 & 1 & dt \\ -\frac{1}{dt} & \frac{1}{dt} & 0 \end{bmatrix} H = [0\ 1\ 0],$$ Equation 1.11 where A is a matrix of the dynamic properties of the system and H is a matrix of the properties of the measured values. By estimating the acceleration at each step within the minimum detection range of the radar sensor (R) in this manner, it is possible to estimate the speed of the target object.

Figure 5:
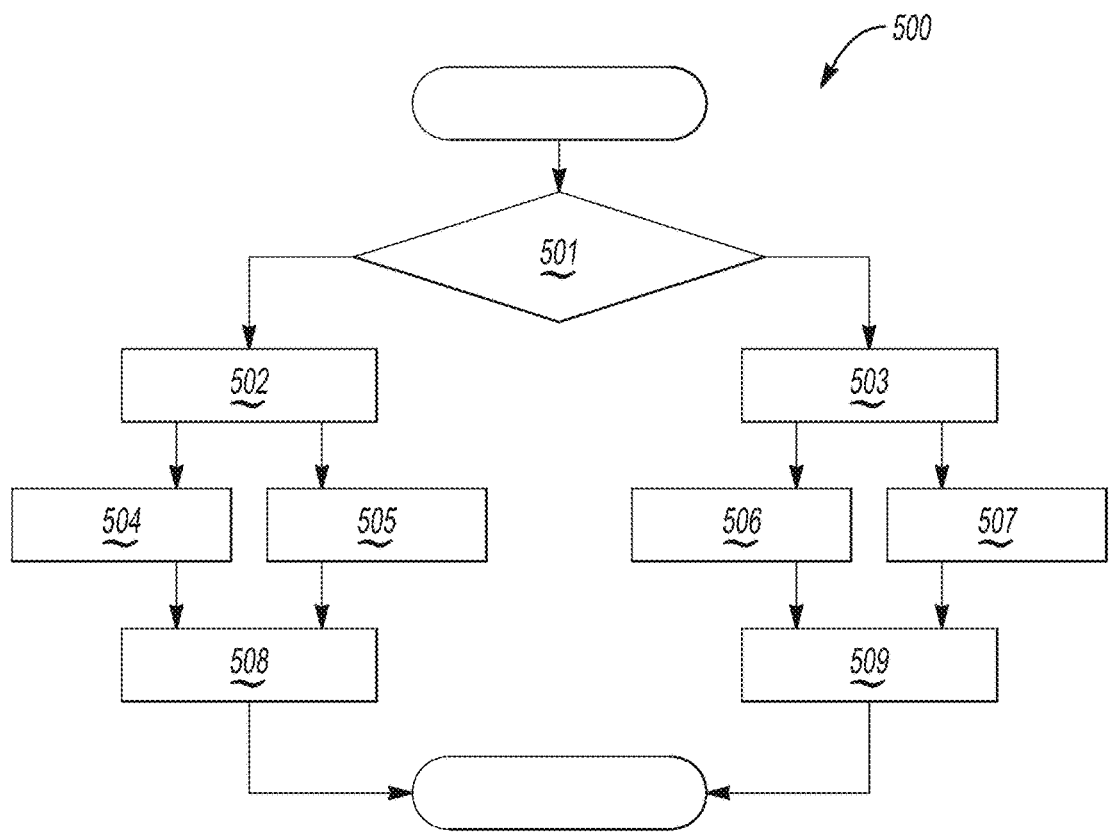
FIG. 5 is a flowchart of the crash prediction algorithm according to an exemplary embodiment.

FIG. 5 is a drawing showing a flowchart of the crash prediction algorithm according to an exemplary embodiment. Referring to FIG. 5, the crash prediction algorithm will be explained. To output the required time to fire (RTTF) of the airbag, accurate crash time prediction and crash type classification are crucial. According to n example, the crash prediction algorithm carries out a 3-step process to predict the crash type, crash point, and crash time. The algorithm is as follows.

Through the ultrasonic sensors (321-324), the crash may be classified as Edge (S502) or Plane (S503), and the most recent N number of data measured by the radar sensor (R) is used to perform Curve Fitting based on a recursive function and predict the trajectory in operation 501. The vehicle crash point and target object crash point may be calculated (operations 504, 506 and operations 505, 507) using the trajectory prediction depending on the crash type. These two crash points are also used in predicting the time of the crash between the vehicle and the target object in operations 508 and 509.

Figure 6:
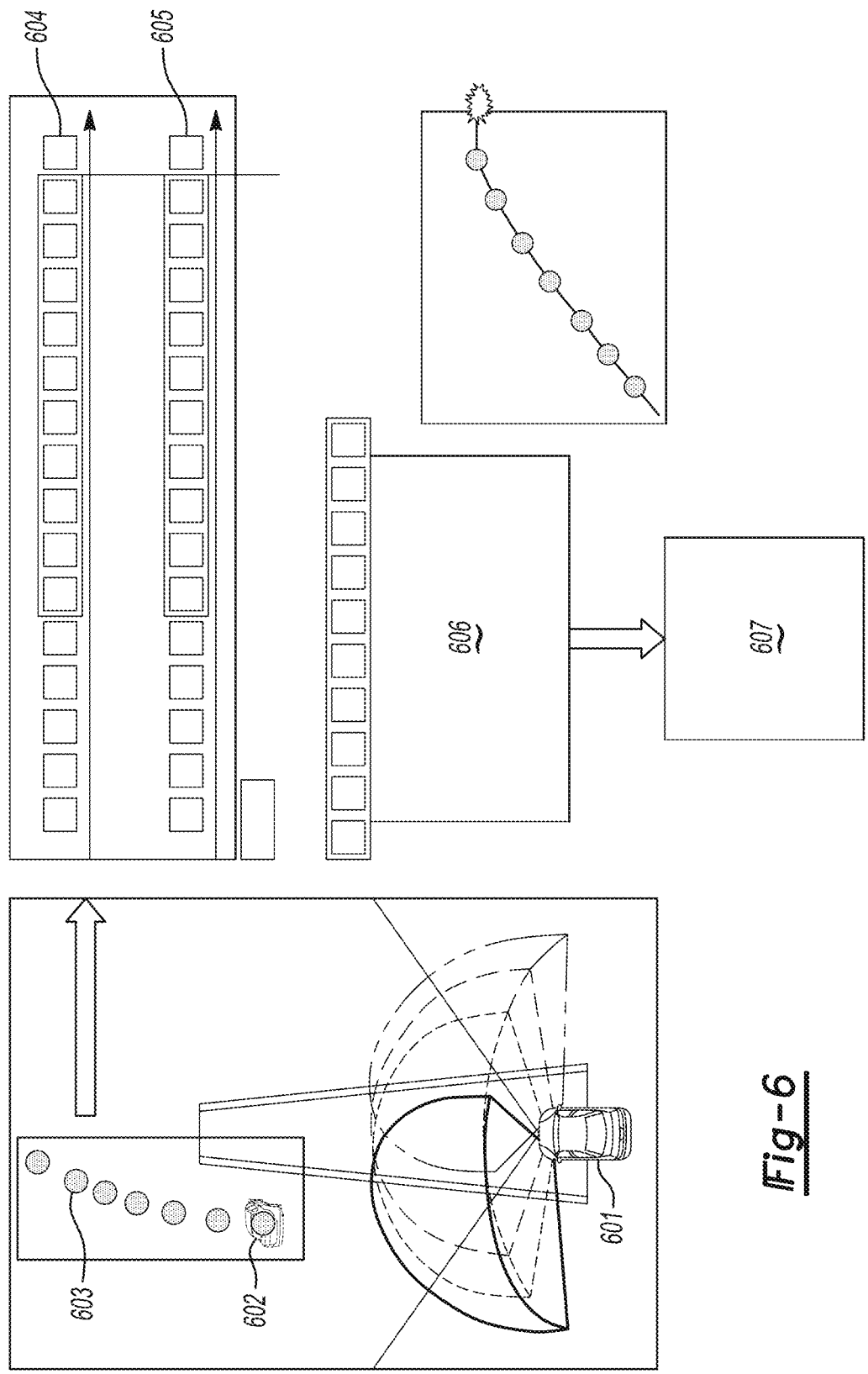
FIG. 6 is a drawing to explain the use of the curve fitting method to express the movement trajectory of an obstacle using a cubic equation.

FIG. 6 is a drawing to explain the use of the curve fitting method to express the movement trajectory of an obstacle using a cubic equation. Referring to FIG. 6, curve fitting, which is used in the crash prediction algorithm, will be explained in detail. Curve fitting is a statistical method used to find the relationship between associated variables and may also be called regression analysis. Among the simple regression models, it uses the method of least squares to decide the coefficients of a polynomial equation so that the sum of the squares of the residual error of each of the sample data is the least. For example, the process by which curve fitting (where n>3) is performed with a quadratic equation for n number of data ($x_{c_i}$, $y_{c_i}$) is as follows.

First, the sum of the square errors ($S_e$) is determined using the following equation 2.1.

$$S_e = \sum_{i=1}^{n} e_i^2 = \sum_{i=1}^{n}(y_{c_i} - k_0 - k_1 x_{c_i} - k_2 x_{c_i}^2)^2$$ Equation 2.1, Partial differentiation of the sum of the square errors ($S_e$) with the respective variables is as follows.

$$\frac{\partial S_e}{\partial k_0} = -2\Sigma(y_{c_i} - k_0 - k_1 x_{c_i} - k_2 x_{c_i}^2),$$ Equation 2.2

$$\frac{\partial S_e}{\partial k_1} = -2\Sigma x_{c_i}(y_{c_i} - k_0 - k_1 x_{c_i} - k_2 x_{c_i}^2),$$ Equation 2.3

$$\frac{\partial S_e}{\partial k_2} = -2\Sigma x_{c_i}^2(y_{c_i} - k_0 - k_1 x_{c_i} - k_2 x_{c_i}^2),$$ Equation 2.4 when these equations are cleaned up to satisfy $$\frac{dS_e}{dk_0} = \frac{dS_e}{dk_1} = \frac{dS_e}{dk_2} = 0,$$

you get Equations 2.5-2.7 below:

$$(n)k_0 + (\Sigma x_{c_i})k_1 + (\Sigma x_{c_i}^2)k_2 = \Sigma y_{c_i}$$ Equation 2.5, $$(\Sigma x_{c_i})k_0 + (\Sigma x_{c_i}^2)k_1 + (\Sigma x_{c_i}^3)k_2 = \Sigma x_{c_i} y_{c_i}$$ Equation 2.6, $$(\Sigma x_{c_i}^2)k_0 + (\Sigma x_{c_i}^3)k_1 + (\Sigma x_{c_i}^4)k_2 = \Sigma x_{c_i}^2 y_{c_i}$$ Equation 2.7, Finally, finding $k_0$, $k_1$, and $k_2$ using the 3 equations above gives the coefficient for an equation that connects n number of sample data.

Referring to FIG. 6, the target object 602 in front of the vehicle 601 moves along the trajectory of the red dot 603, and this movement is saved as coordinates 604 and 605 through the radar sensor. When the movement trajectory of the target object in front of the vehicle is expressed as a cubic equation 606 based on this data, two curves used to predict the crash point prediction algorithm and the crash time prediction algorithm are obtained (607).

Referring to FIGS. 7-13, the crash type determination algorithm will be explained. According to an example, there are two types of crash, and crash times are predicted in a variety of crash situations. Crash type prediction is performed using the measurement values from the ultrasonic sensor, and as the respective sensors are installed on different points on the front of the vehicle, if two or more ultrasonic sensors measure the same position, such point becomes the crash point of the vehicle, and the crash is determined to be an edge type crash. When this is not the case, all measured points appear to have a constant slope, and the crash is determined to be a plane type crash.

Figure 7:
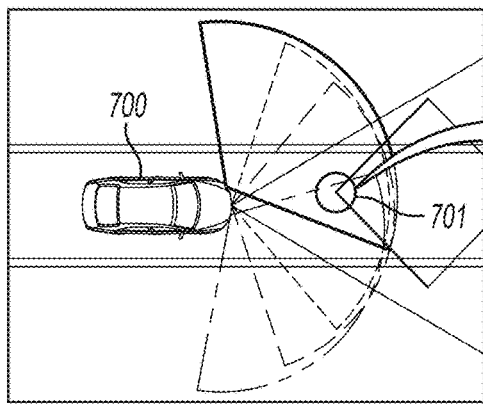
FIG. 7 is a drawing illustrating edge type crash type of vehicle crashes.
Figure 7:
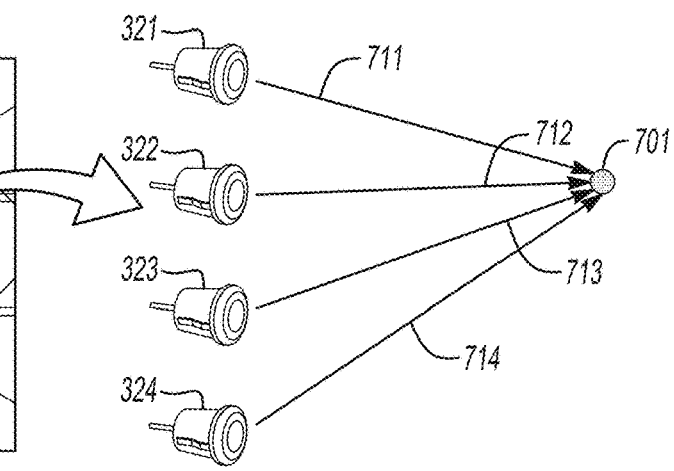

FIG. 7 is a drawing illustrating edge type crash type of vehicle crashes. Referring to FIG. 7, the process by which a crash is determined to be an edge type crash will be explained in detail. The four ultrasonic sensors (321-324) installed on the front of the vehicle 700 respectively measure the closest point 701 on the target object in front of the vehicle. Here, if 2 or more ultrasonic sensors output data ($x_i$, $y_i$) are measured within an error ranges ($e_{edge}$) 711-714, the point in question is certain to crash into the bumper of the vehicle, as shown in FIG. 7. This condition expressed in a mathematic equation is as shown in Equation (2.8)

$$\sqrt{(x_i-x_j)^2+(y_i-y_j)^2}=E_{ij} \quad \text{Equation 2.8,}$$

where $E_{ij}$ is the relative distance between the positions of the target object as measured by the respective ultrasonic sensors. If a minimum of two or more $E_{ij}$ values are measured within an error range, the crash is determined to be an edge type crash.

Figure 8:
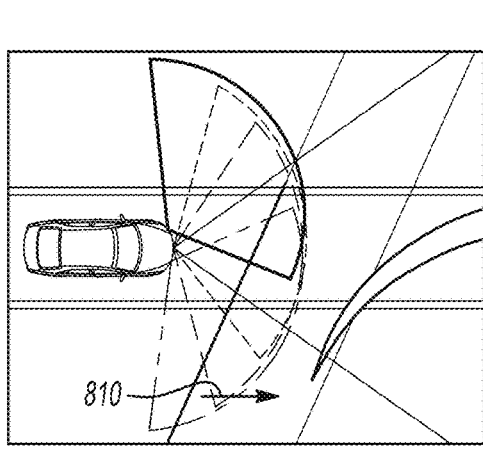
FIG. 8 is a drawing illustrating the plane type crash type of vehicle crashes.
Figure 8:
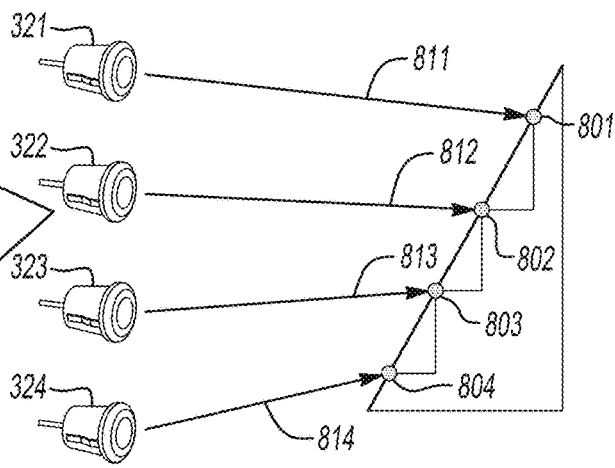

FIG. 8 is a drawing illustrating the plane type crash type of vehicle crashes. Referring to FIG. 8, the process by which a crash is determined to be a plane type crash will be explained in detail. If a target object in front of the vehicle does not have an edge type crash, no particular crash point on the bumper of the vehicle can be found. In this case, the target obstacle has a tendency for its relative distances 811-814 from the vehicle bumper to increase in a similar manner, and the crash occurs in the form of a line with a constant slope, as with a guardrail. Accordingly, as shown in FIG. 8, the shape as measured by the 4 ultrasonic sensors (321-324) can be expressed as a linear equation.

A crash is determined to be a plane type crash when the slope of two adjacent points from among a plurality of points 801-804 is within a certain range of the overall slope ($a_{ij}$), and this can be expressed as Equation (2.9) and Equation (2.10) in the following $$\frac{y_i-y_j}{x_i-x_j}=a_{ij}, \quad \text{Equation 2.9}$$

$$\alpha_{ij=[i,j]|else} < \alpha_{ij=[i,j]|i=min,j=max} \times \alpha, \quad \text{Equation 2.10}$$

where $a_{ij}$ is a slope calculated using the target object position information measured by the respective ultrasonic sensors. If the for two adjacent points is within a certain range of the overall slope, the crash is determined to be a plane type crash.

Figure 9:
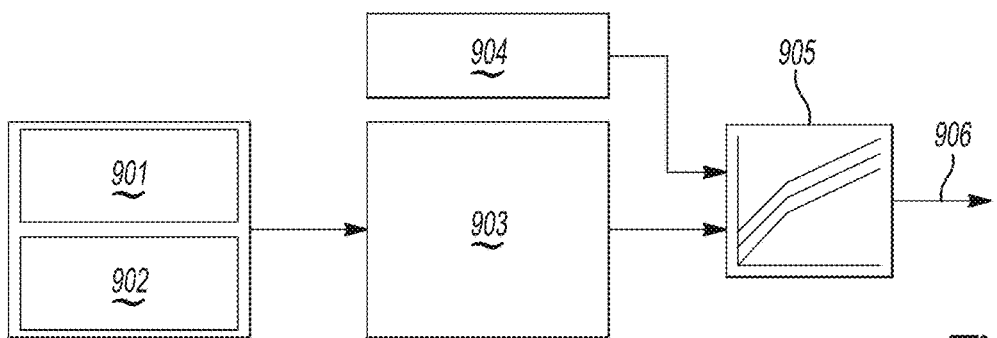
FIG. 9 is a drawing showing the process by which the predicted crash type and the surface slope of the obstacle is used to compute the required time to fire for the airbag.

FIG. 9 is a drawing showing the process by which the predicted crash type and the surface slope of the obstacle is used to compute the required time to fire for the airbag.

Referring to FIG. 9, the crash point prediction algorithm will be explained in detail. After the crash type 901 and the target object gradients 902 are determined, this information is used to determine a type of impact or damage on the vehicle 903. For example, the type of impact to the vehicle may be a full frontal crash, an oblique frontal crash, or a frontal offset deformable crash. The type of impact and vehicle velocity 904 entered into a lookup table 905 and the lookup table provides the RTTF 906.

Figure 10:
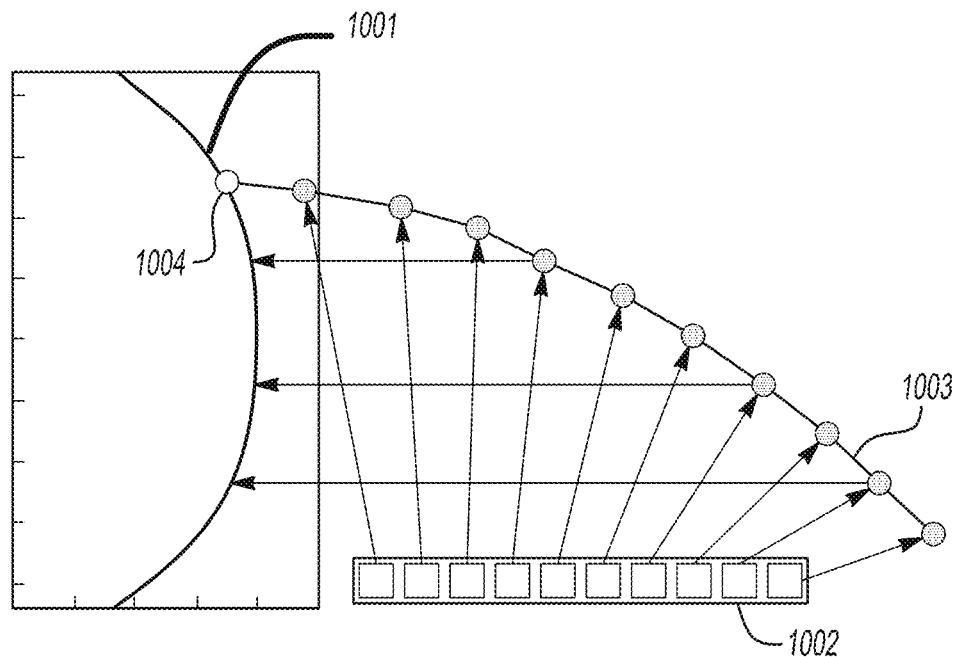
FIG. 10 and FIG. 11 are drawings illustrating the calculation of the vehicle crash point and the target object crash point in an edge type crash.
Figure 11:
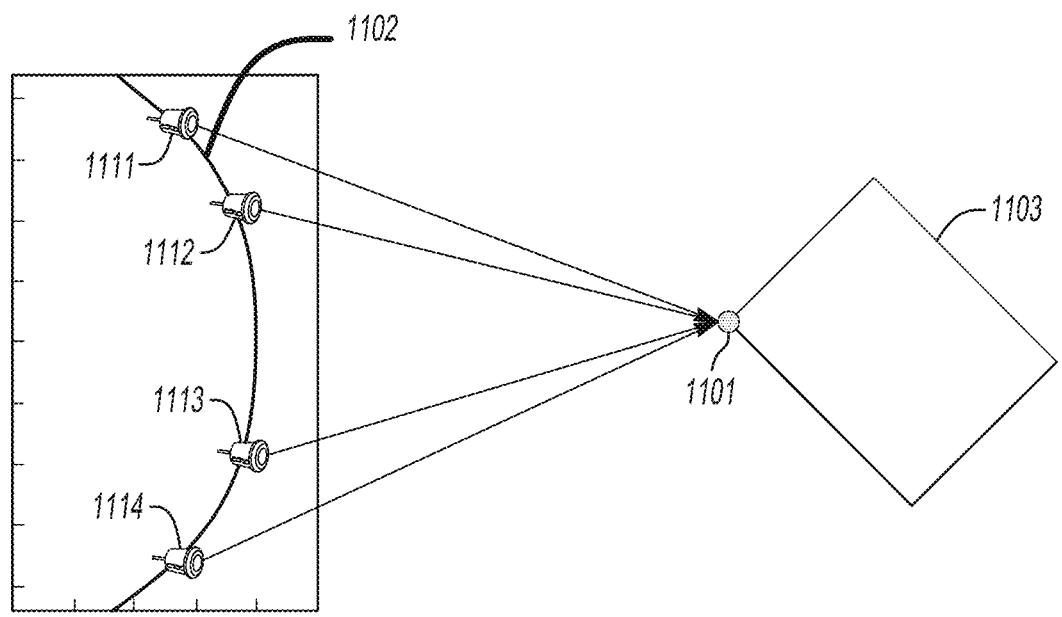

FIG. 10 and FIG. 11 are drawings illustrating the calculation of the vehicle crash point and the target object crash point in an edge type crash. There are two types of crash points, the vehicle crash point and the target object crash point. The former is a certain point on the front bumper of the vehicle, and the latter refers to a certain point on the target obstacle in front of the vehicle, which will crash into the vehicle. This process is carried out using curve fitting, which was explained in the foregoing.

Referring to FIG. 10, to predict the accurate crash point and crash time, accurate data as to the shape of the vehicle bumper 1001 is necessary. Using the n number of latest data 1002 measured by the radar sensor and the curve fitting method, the movement trajectory 1003 is expressed in the form of a cubic equation. The point where the distance between the value gained by substituting the Y coordinate of the vehicle bumper into the cubic equation and the coordinates of the respective points on the bumper 1001 corresponds to a minimum distance ($R_i$) becomes the vehicle crash point. This process can be expressed as Equations 2.11 to 2.13

$$x=p(1)y^3+p(2)y^2+p(3)y+p(4) \quad \text{Equation 2.11,}$$

where x is a cubic polynomial equation to express the movement trajectory of the front target object and the intersection point of the future movement of the target object and the bumper is determined to be the predicted crash point.

$$R_i=X_{ri}-X_{Bumper_i} \quad \text{Equation 2.12,}$$

where $X_{Bumper_i}$ is bumper coordinates digitalized using i number of data, $X_{Ri}$ is a measured position of the front target object, and $R_i$ is a distance between the measured target object and the bumper.

$$X_{HV}=X_{Bumper_k}, Y_{HV}=Y_{Bumper_k} \quad \text{Equation 2.13,}$$

where $X_{HV}$, $Y_{HV}$ are coordinates of own car bumper 1001 based on position radar where the sensor is installed and k is $R_k=\min(R_i)$.

$$x_{TO}=x_{i_{min}}, y_{TO}=y_{i_{min}} \quad \text{Equation 2.14,}$$

where $x_{TO}$, $y_{TO}$ is a crash point where the difference between the coordinates of the bumper and the coordinates of the target obstacle is at a minimum ($x_{i_{min}}$, $y_{i_{min}}$).

Referring to FIG. 11, in an edge type crash, the target object crash point 1101 becomes the point among the 4 distances (1111-1114) measured by the ultrasonic sensors where the relative distance to object 1103 is at a minimum from bumper 1102.

Figure 12:
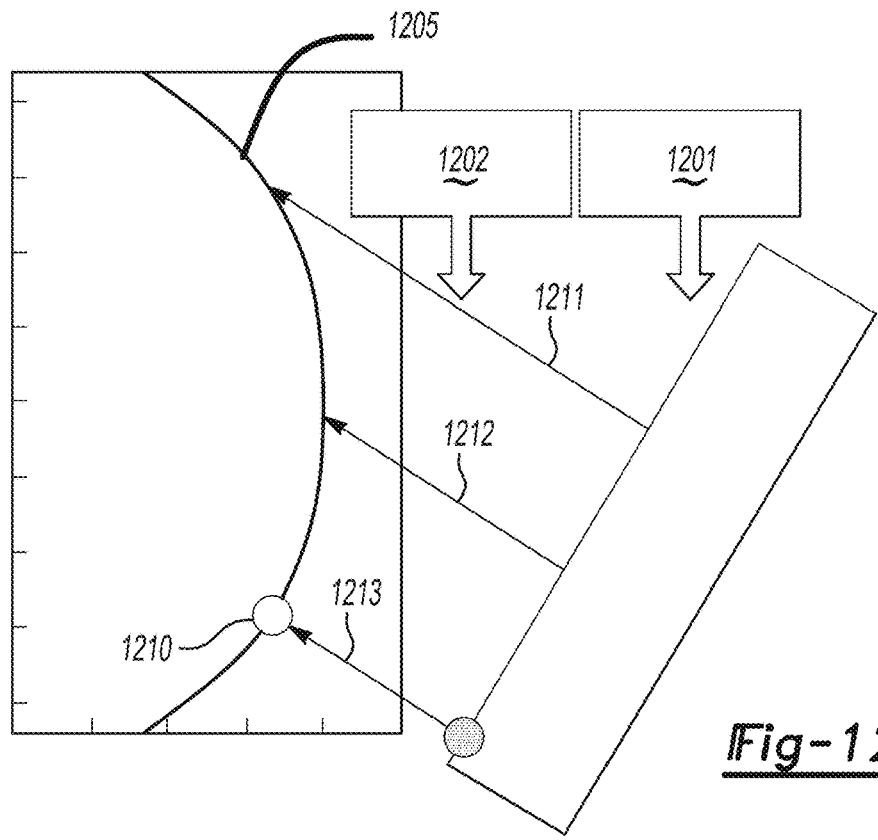
FIG. 12 and FIG. 13 are drawings illustrating the calculation of the vehicle crash point and the target object crash point in a plane type crash.
Figure 13:
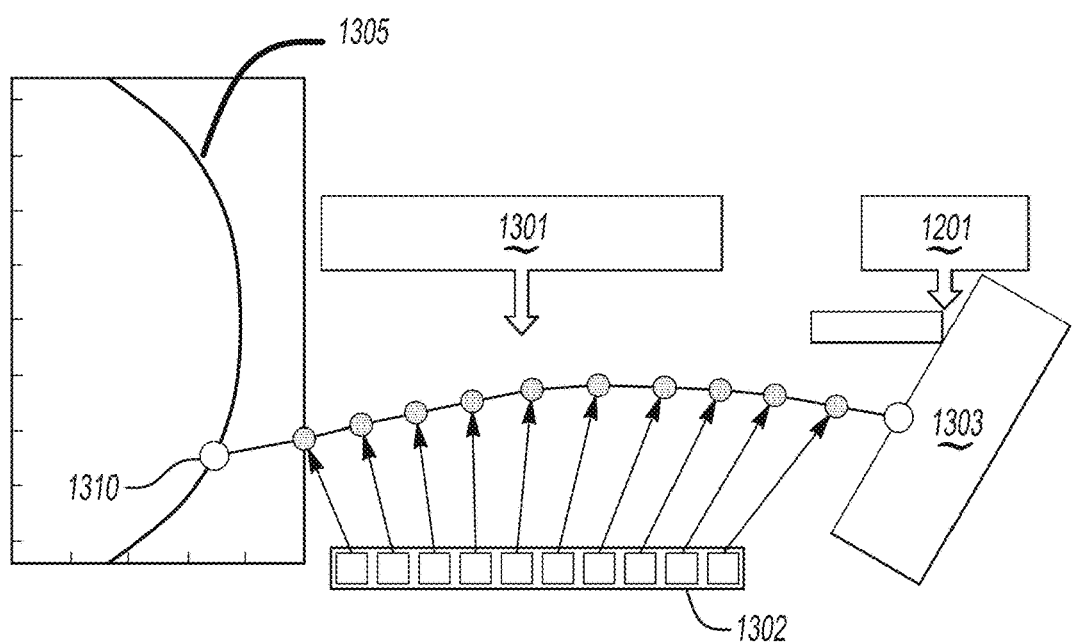

FIG. 12 and FIG. 13 are drawings illustrating the calculation of the vehicle crash point and the target object crash point in a plane type crash.

Referring to FIG. 12, in a plane type crash, the target obstacle does not appear as a single point, unlike in an edge type crash, and takes on a linear shape. Accordingly, it is necessary to predict the crash point between the vehicle bumper and the target object.

According to an example, if it is assumed that there is no major change in yawing motion prior to the occurrence of the crash, the movement of the straight line may be predicted using the relative speed measured by the radar sensor. Using the relative speed measured by the radar sensor, the speed vector of vehicle 1205 may be determined, and through Equation (2.15), the slope of the straight line 1201 of FIG. 12 is determined. The slope of straight line 1202 is defined by a point on the vehicle bumper and the speed vector. Defining the distance between the intersection points of the two straight lines found in this manner as $R_i$, it becomes possible to predict the final crash point 1210 using the straight line among many lines 1211-1213 where $R_i$ is at a minimum.

$$a_2 = \frac{V_{Ry}}{V_{Rx}} \qquad \text{Equation 2.15}$$

$$b_2 = -a_2 X_{Bumper} + Y_{Bumper} \qquad \text{Equation 2.16}$$

$$\begin{cases} y = a_1 x + b_1 \\ y = a_2 x + b_2 \end{cases} \rightarrow \text{get } x_{TO_i}, y_{TO_i}, \qquad \text{Equation 2.17}$$

where $a_1$, $b_1$ are coefficients of the straight line equation expressing the shape of the measured plane type target object, $a_2$, $b_2$ are coefficients of the straight line equation defined by a point on the bumper of a vehicle and the speed vector.

$$R_i = \sqrt{(X_{Bumper_i} - x_{TO_i})^2 + (Y_{Bumper_i} - y_{TO_i})^2} \qquad \text{Equation 2.18,}$$

where $R_i$ is a difference in a position between the bumper ($X_{Bumper_i}$, $Y_{Bumper_i}$) and the TO (That is, the distance to the target object)

$$X_{HV} = X_{Bumper_k}, Y_{HV} = Y_{Bumper\_k} \qquad \text{Equation 2.19,}$$

where k is $R_k = \min(R_i)$ or the point with the shortest distance among the calculated $R_i$ is predicted as the crash point ($X_{HV}$, $Y_{HV}$).

After the vehicle crash point has been predicted, a plane type crash can be thought of as a crash between the vehicle crash point and a straight line, not as a crash between the vehicle and a target object. Accordingly, by predicting the movement trajectory of the vehicle crash point, the target obstacle crash point may be predicted.

Referring to FIG. 13, applying the curve fitting method to the vehicle crash point 1201 found previously and the n number of relative speeds 1302 measured previously through the radar sensor ($v_{rx}$, $v_{ry}$), likewise a cubic equation is given, and the intersection point between the equation found in this manner and the straight line 1201 becomes the crash point of the target object 1303.

$$\begin{cases} x = p(1)y^3 + p(2)y^2 + p(3)y + p(4) \\ y = a_1 x + b_1 \end{cases}, \qquad \text{Equation 2.20}$$

where n number of previous relative speed values from the vehicle crash point are used to obtain the predicted movement trajectory of the target object, and curve fitting is applied to such to predict the target object crash point 1303.

By using the crash points of the vehicle 1310 and the target object 1303 predicted in this manner, it is possible to predict the crash time. Here, the same method was used for all crash types, and the curve fitting method is applied to n number of lateral relative speeds ($V_{Rx}$) measured using the radar sensor and the X axis coordinates of the two predicted crash points to express the lateral movement trajectory 1301 according to time as an equation. The crash time refers to the point in time when the lateral relative distance between the vehicle and the target object becomes 0 (e.g., Y(tn)=0), with the X axis being time and the Y axis being the relative lateral movement trajectory of the target object. In other words, using the lateral speed over the previous n number of steps at the target object crash point at an arbitrary point in time, the lateral distance according to time over the previous n number of steps is found. Curve fitting is now applied to this, and the time when the distance becomes 0 is predicted to be the crash time.

$$t = p(1)y^3 + p(2)y^2 + p(3)y + p(4) \qquad \text{Equation 2.21,}$$

where t is a cubic polynomial function to express the lateral relative distance from the target obstacle by time.

Figure 14:
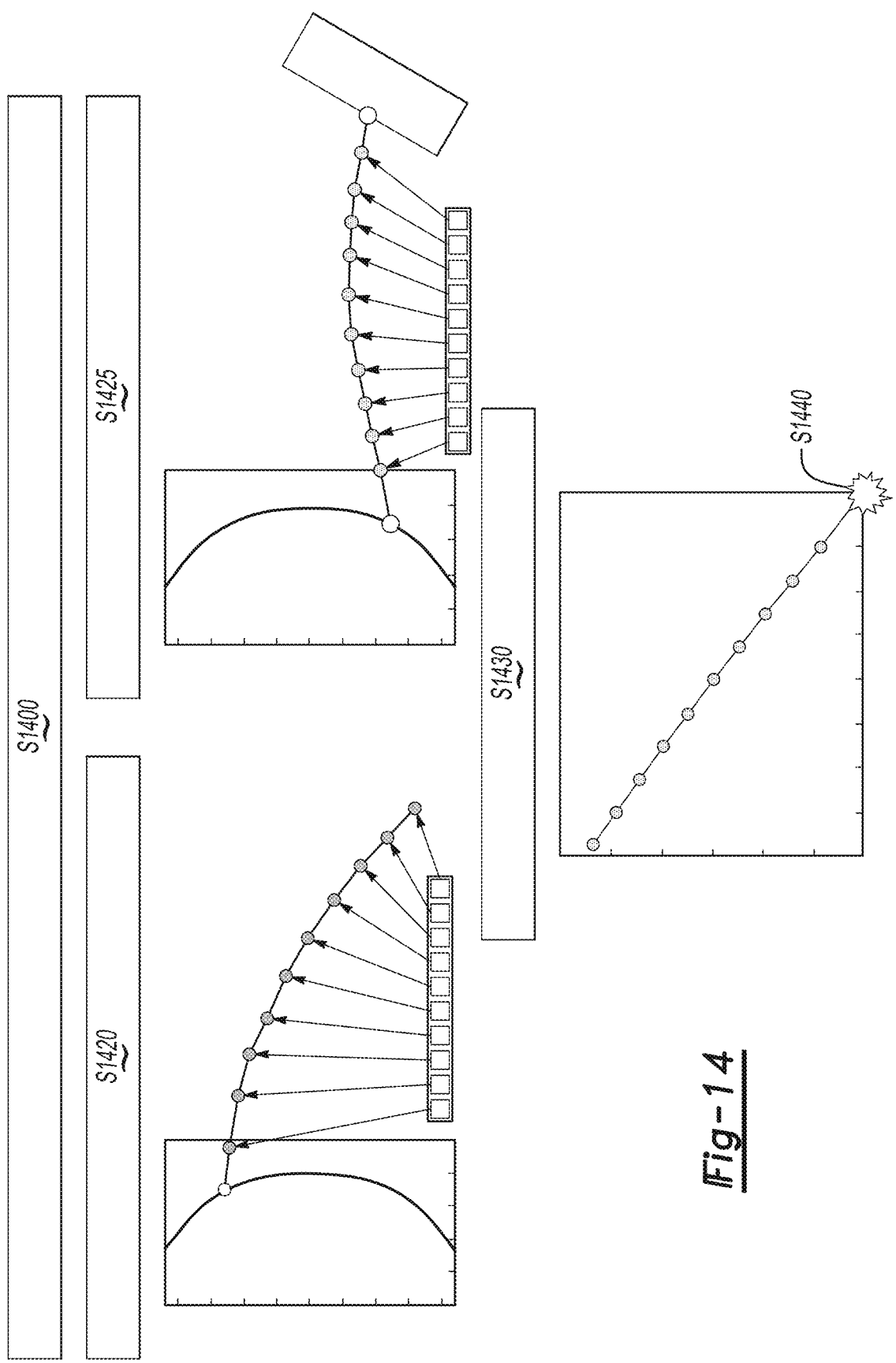
FIG. 14 is a drawing illustrating the expression of the movement trajectory according to radar sensor measurement data to compute the time point of a crash.

FIG. 14 is a drawing illustrating the expression of the movement trajectory according to radar sensor measurement data to compute the time point of crash.

Referring to FIG. 14, the crash prediction algorithm determines a type of crash using the curve fitting algorithm for radar sensor measurement data in operation S1400 described with respect to FIGS. 10 and 11 for an edge type crash (S1420) and FIGS. 12 and 13 for a plane type crash (S1425). The final crash time point in operation S1440 is then predicted based on the lateral movement trajectory of target object in operation S1430.

Figure 15:
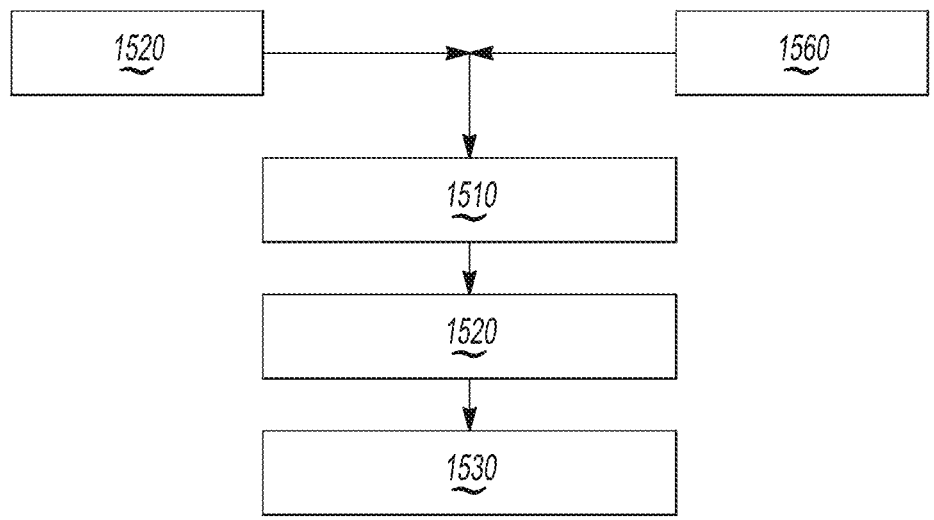
FIG. 15 is a block diagram to explain the components of an apparatus that determines crash type, crash point and crash time according to an exemplary embodiment.

FIG. 15 is a block diagram to explain the components of an apparatus that determines crash type, crash point and crash time according to an exemplary embodiment.

Referring to FIG. 15, the apparatus that determines crash type, crash point and crash time includes a coordinate calibration module 1510, a vehicle status estimation module 1520, a crash prediction module 1530, a radar sensor 1550 and an ultrasonic sensor 1560.

Radar sensor 1550 and ultrasonic sensor 1560 are similar to radar sensor 301 and ultrasonic sensor 302, respectively and their description is similar to the description for radar sensor 301 and ultrasonic sensor 302 provided above. Thus, repeated description is omitted. The coordinate calibration module 1510, the vehicle status estimation module 1520, and the crash prediction module 1530 may be implemented by one or more processors, controllers, and memories.

The coordinate calibration module 1510 is configured to calibrate coordinates measured by the ultrasonic sensors 1560 to the coordinate system of the radar sensor 1550. The vehicle status estimation module 1520 is configured to use a Kalman filter to estimate the speed, position and acceleration of the vehicle in response to determining that the vehicle entered the minimum detection range of the radar sensor for the target object based on the calibrates coordinates determined by the coordinate calibration module. The crash prediction module 1530 is configured to predict crash type, crash point and crash time based on speed, position and acceleration of the vehicle determined by the vehicle status estimation module.

Figure 16:
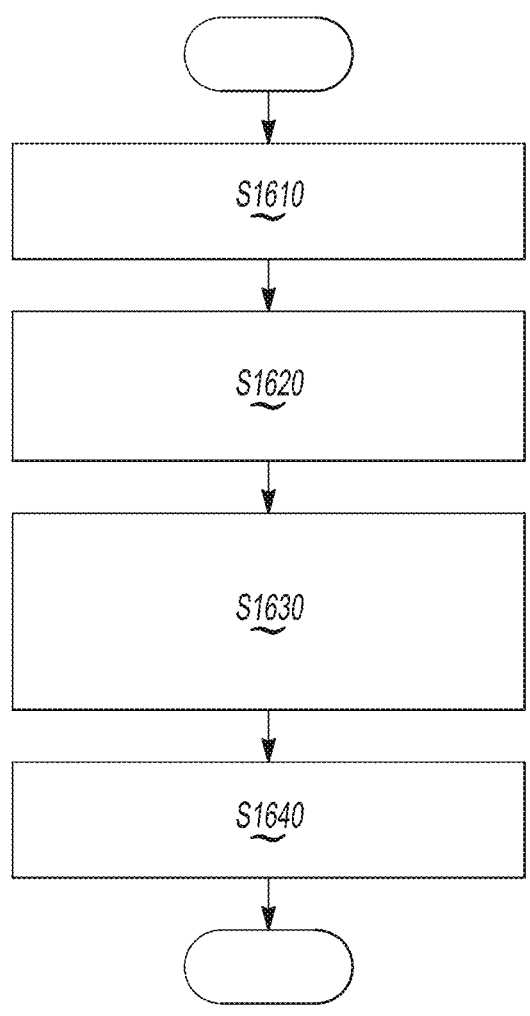
FIG. 16 is a flowchart of the algorithm used to determine crash type, crash point and crash time, according to an exemplary embodiment.

FIG. 16 is a flowchart of the algorithm used to determine crash type, crash point and crash time, according to an exemplary embodiment.

Referring to FIG. 16, radar sensor and ultrasonic sensors measure coordinates for target objects in operation 1610. The coordinate calibration module then calibrates coordinates measured by the ultrasonic sensors to the coordinate system of the radar sensor in operation S1620. In response to the vehicle entering the minimum detection range of the radar sensor for the target object, vehicle status estimation module uses Kalman filter to estimate the speed, position and acceleration of the vehicle in operation S1630. Based on speed, position and acceleration of the vehicle, the crash prediction module predicts crash type, crash point and crash time in operation S1640.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of predicting a crash, the method comprising:
    detecting, using a radar sensor and at least two ultrasonic sensors, coordinates of a target obstacle based on radar coordinate information of the radar sensor and ultrasonic coordinate information of the at least two ultrasonic sensors;
    translating, using a controller of a vehicle, the ultrasonic coordinate information to a coordinate system of the radar coordinate information and generating combined coordinate information;
    estimating, using the controller of the vehicle, a position, speed, and acceleration of the target obstacle using the combined coordinate information based on the target obstacle being closer to the vehicle than a predetermined distance;
    determining, using the controller of the vehicle, a crash type from among an edge type crash, in which a single point representing the target obstacle first contacts the vehicle, or a plane type crash, in which a linear shape representing the target obstacle contacts the vehicle, between the vehicle and the target obstacle based on the estimated position, speed and acceleration of the target obstacle, wherein the determining the crash type is further based on a first of the coordinates of the target obstacle detected by two of the at least two ultrasonic sensors and on a second of the coordinates of the target obstacle detected by the two of the at least two ultrasonic sensors;
    determining, using the controller of the vehicle, a three-dimensional movement trajectory based on the estimated position, speed and acceleration of the target obstacle and the determined crash type;
    predicting, using the controller of the vehicle, a crash point on the vehicle, a crash point on the target obstacle and a crash time based on the three-dimensional movement trajectory; and
    determining, using the controller of the vehicle, a required time to fire an airbag, based on the crash type and the crash time, in order to control an airbag controller.

2. The method of claim 1, wherein the predetermined distance comprises a minimum detection range of the radar sensor.

3. The method of claim 1, wherein the determining the three-dimensional movement trajectory comprises applying a curve fitting using the estimated position, speed and acceleration of the target obstacle.

4. The method of claim 1, wherein the determining that the crash type is the edge type crash is based on determining that a first relative distance based on a first distance between the first of the coordinates of the target obstacle detected by the two of the at least two ultrasonic sensors and a second distance between the second of the coordinates of the target obstacle detected by the two of the at least two ultrasonic sensors is within a first range of a second relative distance that is obtained using at least one additional ultrasonic sensor; and
    the determining that the crash type is the plane type crash is based on determining that a slope obtained using the first distance and the second distance is within a second range of an overall slope obtained using the at least one additional ultrasonic sensor.

5. The method of claim 3, wherein, based on the determining the crash type indicating the edge type crash, the method further comprises using N number of coordinates of the target obstacle detected by the radar sensor and the curve fitting to determine the three-dimensional movement trajectory,
    wherein the predicting the crash point on the vehicle and the predicting the crash point on the target obstacle are based on expressing the three-dimensional movement trajectory as a cubic equation, and the single point representing the target obstacle that first contacts the vehicle is the crash point on the target obstacle and is found as the coordinate of the target obstacle among the coordinates of the target obstacle detected by the at least two ultrasonic sensors that is closest to the vehicle.

6. The method of claim 5, wherein
    the predicting the crash time includes obtaining a lateral movement trajectory using curve fitting on n number of lateral relative speeds measured by the radar sensor, the crash point on the vehicle, and the crash point on the target obstacle and determining a time at which relative lateral distance between the vehicle and the target obstacle becomes 0.

7. The method of claim 3, wherein, based on the determining indicating that the crash type is the plane type crash, the method further comprises using N number of coordinates of the target obstacle detected by the radar sensor and the curve fitting to determine the three-dimensional movement trajectory, wherein the predicting the crash point on the vehicle and the crash point on the target obstacle is based on expressing the three-dimensional movement trajectory as a cubic equation.

8. The method of claim 7, wherein
    the predicting the crash time includes obtaining a lateral movement trajectory using curve fitting on n number of lateral relative speeds measured by the radar sensor, the crash point on the vehicle, and the crash point on the target obstacle and determining a time at which relative lateral distance between the vehicle and the target obstacle becomes 0.

9. A non-transitory computer readable storage medium comprising computer instructions executable by a computer to perform the method of claim 1.

10. An apparatus that predicts a crash, the apparatus comprising:
    at least one memory comprising computer executable instructions; and
    at least one processor configured to read and execute the computer executable instructions, wherein the at least one memory and the at least one processor are part of a controller of a vehicle, the computer executable instructions causing the at least one processor to:

detect coordinates of a target obstacle based on radar coordinate information of a radar sensor and ultrasonic coordinate information of at least two ultrasonic sensors;

translate the ultrasonic coordinate information to a coordinate system of the radar coordinate information and generate combined coordinate information;

estimate a position, speed, and acceleration of the target obstacle using the combined coordinate information based on the target obstacle being closer to the vehicle than a predetermined distance;

determine a crash type from among an edge type crash, in which a single point representing the target obstacle first contacts the vehicle, or a plane type crash, in which a linear shape representing the target obstacle contacts the vehicle, between the vehicle and the target obstacle based on the estimated position, speed and acceleration of the target obstacle, wherein the determining the crash type is further based on a first of the coordinates of the target obstacle detected by two of the at least two ultrasonic sensors and on a second of the coordinates of the target obstacle detected by the two of the at least two ultrasonic sensors;

determine a three-dimensional movement trajectory based on the estimated position, speed and acceleration of the target obstacle and the determined crash type;

predict a crash point on the vehicle, a crash point on the target obstacle and a crash time based on the three-dimensional movement trajectory; and set a required time to fire of at least one airbag based on the crash type and the crash time; and an airbag electronic controller unit; and an airbag, wherein the computer executable instructions further cause the at least one processor to control the airbag electronic controller unit to fire the airbag according to the required time to fire.

11. The apparatus of claim 10, wherein the predetermined distance comprises a minimum detection range of the radar sensor.

12. The apparatus of claim 10, wherein the computer executable instructions cause the at least one processor to determine the three-dimensional movement trajectory by applying a curve fitting equation using the estimated position, speed and acceleration of the target obstacle.

13. The apparatus of claim 10, wherein the computer executable instructions cause the at least one processor to determine that the crash type is the edge type crash based on determining that a first relative distance based on a first distance between the first of the coordinates of the target obstacle detected by the two of the at least two ultrasonic sensors and a second distance between the second of the coordinates of the target obstacle detected by the two of the at least two ultrasonic sensors is within a first range of a second relative distance that is obtained using at least one additional ultrasonic sensor; and to determine that the crash type is the plane type crash based on determining that a slope obtained using the first distance and the second distance is within a second range of an overall slope obtained using the at least one additional ultrasonic sensor.

14. The apparatus of claim 12, wherein the computer executable instructions cause the at least one processor to:

determine that the crash type is the edge type crash and, using N number of coordinates of the target obstacle detected by the radar sensor and the curve fitting equation, determine the three-dimensional movement trajectory;

predict the crash point on the vehicle and predict the crash point on the target obstacle based on expressing the three-dimensional movement trajectory as a cubic equation, and the single point representing the target obstacle that first contacts the vehicle is the crash point on the target obstacle and is found as the coordinate of the target obstacle among the coordinates of the target obstacle detected by the at least two ultrasonic sensors that is closest to the vehicle.

15. The apparatus of claim 14, wherein the computer executable instructions cause the at least one processor to:

predict the crash time by obtaining a lateral movement trajectory using curve fitting on n number of lateral relative speeds measured by the at least one radar sensor, the crash point on the vehicle, and the crash point on the target obstacle and determining a time at which relative lateral distance between the vehicle and the target obstacle becomes 0.

16. The apparatus of claim 12, wherein the computer executable instructions further cause the at least one processor, based on determining that the crash type is the plane type crash to predict the crash point on the vehicle and the crash point on the target obstacle based on using N number of coordinates of the target obstacle detected by the radar sensor and the curve fitting to determine the three-dimensional movement trajectory, wherein predicting the crash point on the vehicle and the crash point on the target obstacle is based on expressing the three-dimensional movement trajectory as a cubic equation.

17. The apparatus of claim 16, wherein the computer executable instructions further cause the at least one processor to:

predict the crash time by obtaining a lateral movement trajectory using curve fitting on n number of lateral relative speeds measured by the at least one radar sensor, the crash point on the vehicle, and the crash point on the target obstacle and determining a time at which relative lateral distance between the vehicle and the target obstacle becomes 0.

* * * * *